Dec. 17, 1968    H. R. WEISS    3,416,815
SEAT BELT MASSAGER
Filed June 29, 1967
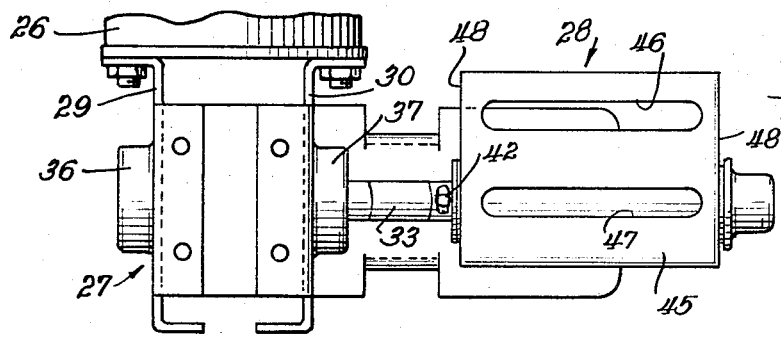
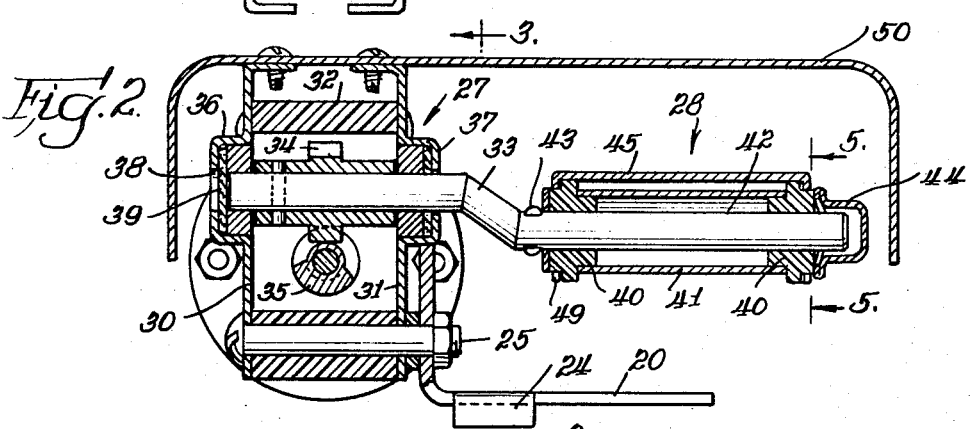
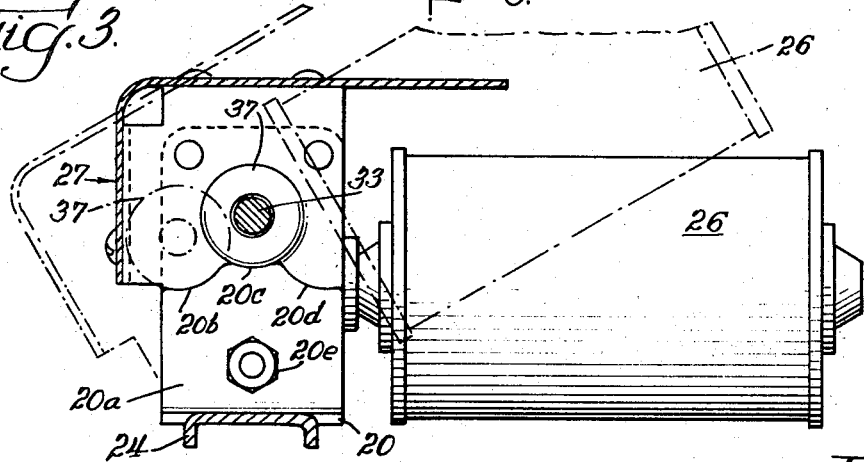
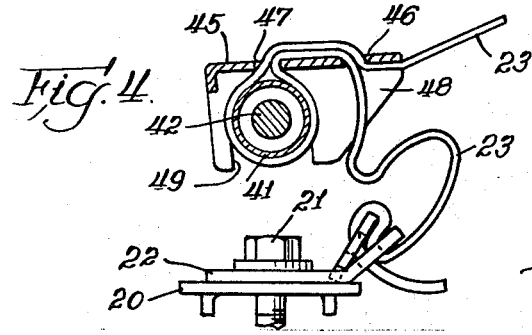
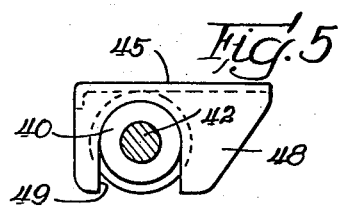
Inventor
Hans R. Weiss United States Patent Office 3,416,815
Patented Dec. 17, 1968

3,416,815
SEAT BELT MASSAGER
Hans R. Weiss, Niles, Ill., assignor to The Dantamor Company, Chicago, Ill., a corporation of Illinois
Filed June 29, 1967, Ser. No. 650,105
9 Claims. (Cl. 280—150)

ABSTRACT OF THE DISCLOSURE

The driving unit for a combined safety seat belt and abdominal massaging apparatus is mounted to a structural member of a vehicle by the seat belt mounting means thereby simplifying mounting and insuring correct relationship with the seat belt. Designed for directly driving the belt, the unit is adaptable to a variety of seat belt mountings and is readily adapted for use for both the right hand and the left hand seat positions.

BACKGROUND OF THE INVENTION

A combined safety seat belt and abdominal massaging apparatus is described in the copending application of Hans R. Weiss, Ser. No. 492,225, filed Oct. 1, 1965, now Patent No. 3,337,237. The instant invention is an improvement over the apparatus therein shown and described. The driving unit comprising the electric motor and the transmission mechanism is designed to be mounted upon a structural member of the vehicle by means of the same bolt that is employed to anchor one end of the seat belt. In this way installation is considerably simplified and the driving crank of the driving unit is properly located with reference to the seat belt. A mounting bracket permits adaptation to the peculiarities of the seat belt mountings for various automotive vehicles and the driving unit is so designed that it is readily adapted for use in driving the belt serving the left hand side of the seat or the belt serving the right hand side of the seat. Provision is made for directly connecting the crank arm of the driving unit to the seat belt by means of a simple clip.

The object of the present invention is to provide a driving unit for a seat belt massager which is substantially universal in adaptability to various types of seat belt anchorages and may readily be adapted for right hand or left hand usage. Another object is to provide means for directly driving the seat belt in reciprocation. A further object is to provide a driving unit which is simple and therefore relatively inexpensive and which is easily installable.

Description of the drawing

In the accompanying drawing,

FIG. 1 is a plan view, partly broken away, of the driving unit for a seat belt massager without the safety cover in position;

FIG. 2 is a cross-sectional view of the driving unit of FIG. 1 with safety cover in position;

FIG. 3 is a cross-sectional view taken at the line 3—3 of FIG. 2;

FIG. 4 is a detailed view, in cross section, showing the mounting and driving arrangements of the apparatus, and FIG. 5 is a cross-sectional view taken at the line 5—5 of FIG. 2.

Description of the preferred embodiment

The driving unit for the seat belt massager is mounted by means of a bracket 20 upon a structural member of the vehicle by means of the same bolt 21 (FIG. 4) that is used to fasten the anchoring plate 22 of the seat belt 23 to the structure. Bracket 20 is preferably provided with a pair of shallow flanges 24 which grip the carpeting or other surface material of the vehicle and augment the friction of the mounting to prevent shifting of the position of the bracket.

The driving unit is mounted upon bracket 20 by means of bolt 25. This unit comprises an electric motor 26, connected by wires, not shown, to the battery of the vehicle, and a mechanical transmission assembly 27 including a crank assembly 28. The motor is fastened to the transmission assembly by means of brackets 29, 30 extending from side plates 30, 31 which are permanently fastened to the housing 32 of the transmission assembly. Crank 33, journaled in side plates 30 and 31, is driven by a gear 34 which, in turn, is driven by a worm gear 35 which is pinned to the motor shaft. The hub portions 36, 37 of the side plates 30, 31 are provided with central openings 38 for the passage therethrough of the crank shaft, as required, a solid fiber disc 39 being arranged within hub 36 to close the unused opening in the particular arrangement shown.

A freely rotating spool, comprising nylon bushings 40 and barrel 41, is arranged on the eccentric arm 42 of the crank. The spool is held in position by ears 43 and retainer 44. The ends of barrel 41 telescope the inner portions of bushings 40 which have middle portions of increased diameter to provide annular shoulders to serve as stops for the ends of the barrel, the outer reduced portions serving a purpose presently to be described. The spool is free to rotate upon the crank or, stated more precisely with regard to actual operation of the driving unit, the eccentric portion of the crank is free to rotate within the spool as the crank rotates, A clip 45 is provided for locking the seat belt to the spool so that the belt may be driven in reciprocation when the crank is rotated by the motor. As is best seen in FIG. 1, the broad panel of clip 45 is provided with a pair of spaced slots 46, 47. Flanges 48, depending from both sides of the clip panel, are provided with recesses 49 dimensioned to accommodate the outer portions of bushings 40 the distance across the recesses at their mouths being slightly less than the diameter of the outer portions of the bushings whereby the clip must be snapped or forced onto the bushings and will be securely retained in position upon the bushings.

The arrangement of the seat belt when locked in position upon the crank assembly is shown in FIG. 4. After the driving unit has been mounted in position at the anchorage of the seat belt, a portion of the belt is doubled and threaded through slots 46 and 47, in that order, and the bight passed over the spool. The belt is then pulled tight as the clip is latched upon the spool bushings to lock the seat belt in operative position to the driving unit. Sufficient slack is provided to permit the crank to operate without interference.

The vertical portion 20a of mounting bracket 20 is provided with three arcuate recesses 20b, 20c, and 20d, all equidistant from mounting bolt 20e and having curvatures conforming to that of hub portions 36 and 37 of side plates 30 and 31. When mounting the driving unit in a vehicle, the motor-transmission assembly is fastened to the mounting bracket with a selected one of the arcuate recesses in engagement with the side plate hub to provide the desired orientation of the motor with respect to the floor of the vehicle. By making it possible to select alternative positions of the motor with respect to the mounting bracket, allowance may be made for varying angularities of the seat belt mountings of different vehicles. An alternative position of the motor is indicated in dot-dash lines in FIG. 3. For the right hand seat position the choice would normally be made between one pair of recesses including the middle recess and for the left hand seat position the choice would be between the other pair of recesses including the middle recess. Thus, the provision of the three alternative recesses makes it possible to use the same bracket for left hand and right hand seat belts as well as to arrange the motor as desired with respect to the floor of the vehicle.

A safety shield 50 may be provided to cover moving parts of the massager driving unit and avoid the possibility of injury to the feet of persons using the back seat of the vehicle.

When the driving unit is properly installed, and the belt fastened by the driver or passenger of the vehicle, activation of the motor will drive the belt in reciprocation across the abdomen of the user. Approximately one and one-half inches of the belt is used for the connection to the driving unit. Since the belt ends are anchored securely to the structural member of the vehicle, the massage driving unit is not depended upon to hold the user of the belt in position in case of accidental impact of the vehicle. In such event, the interposition of the massager driving unit will soften the impact as it gives way responsive to the pull on the belt. Thus the primary function of the seat safety belt is enhanced by the massager.

The invention is claimed as follows:

1. Seat belt massaging apparatus comprising a transmission assembly having an input shaft and output crank having an eccentric arm, electric motor means mounted upon said transmission assembly for driving said input shaft, means for mounting said transmission assembly on a structural member of a vehicle, and means for directly connecting a seat belt to the eccentric arm of said crank to drive the same in reciprocation.

2. Structure in accordance with claim 1 wherein the transmission assembly includes side plates having hubs within which the crank is journaled, said hubs being identical so that said crank may extend out from either side of the transmission to provide either a left hand or a right hand driving unit.

3. Structure in accordance with claim 2 wherein the means for mounting the transmission assembly comprises an angled bracket having one leg thereof affixed to the side of the transmission assembly from which the crank extends, the other leg of said bracket underlying the eccentric arm of said crank whereby to admit of the common mounting of said assembly and one end of the seat belt.

4. Structure in accordance with claim 3 wherein the bracket is affixed to the transmission assembly by means of a single bolt, an arcuate recess being provided at the end of said bracket to engage the hub of the assembly side plate to fix the position of the assembly with respect to said bracket.

5. Structure in accordance with claim 4 wherein a plurality of alternatively usable arcuate recesses are provided at the end of the bracket to provide alternative positions of the assembly with respect to said bracket.

6. Structure in accordance with claim 1 wherein the means for connecting the seat belt to the crank comprises a clip for forming and retaining a bight in said belt at a predetermined location for driving association with the eccentric arm of said crank.

7. Structure in accordance with claim 1 and including a spool on the eccentric arm of the crank, said spool being journaled for free rotation on said crank arm.

8. Structure in accordance with claim 7 wherein the means of connecting the seat belt to the crank comprises a clip having a pair of spaced slots each adapted to permit a doubled seat belt to pass therethrough whereby to form a bight in said belt adapted to encircle the spool, said clip having latching means for demountably fastening said clip to said spool.

9. Seat belt massager apparatus for installation and use in a vehicle comprising, in combination, a seat belt having both ends thereof securely bolted to the vehicle structure, a driving unit for driving said seat belt in reciprocation near one end thereof, said unit comprising an electric motor driven transmission having an output crank extending therefrom, a mounting bracket affixed to said unit and having an arm underlying said crank, said arm being bolted to the vehicle structure by the same bolt that bolts said one end of said belt to the vehicle structure whereby to locate said crank approximately in line with said belt, and a clip latched to said crank through which said belt passes to directly and drivingly engage said crank.

References Cited

UNITED STATES PATENTS

| | | | |
|---|---|---|---|
| 1,868,452 | 7/1932 | Whitney | 128—33 |
| 1,969,247 | 8/1934 | Wolcott | 128—63 |
| 2,980,109 | 4/1961 | Schein | 128—63 |
| 3,337,237 | 8/1967 | Weiss | 280—150 |
| 3,344,783 | 10/1967 | Stoll | 128—63 |

BENJAMIN HERSH, *Primary Examiner.*

L. D. MORRIS, Jr., *Assistant Examiner.*

U.S. Cl. X.R.

128—63